3,438,892
DRYING FLUIDS WITH REGENERABLE SULFONATE CATION-EXCHANGE RESINS
Charles E. Wymore and Robert M. Wheaton, Midland, Mich., assignors to The Dow Chemical Company, Midland, Mich., a corporation of Delaware
No Drawing. Continuation-in-part of application Ser. No. 478,032, Aug. 4, 1965, which is a continuation-in-part of application Ser. No. 85,150, Jan. 26, 1961. This application Oct. 16, 1967, Ser. No. 675,294
Int. Cl. B01d 15/06; C02b 1/76, 1/14
U.S. Cl. 210—32
14 Claims

ABSTRACT OF THE DISCLOSURE

Dry sulfonic acid cation-exchange resins in monovalent salt form are efficient desiccants for many fluids. Because of the high water capacity and relatively low thermal regeneration temperature, a resin column regenerated in situ at 90°–200° C. is particularly suited for removing small amounts of water from liquid organic process streams.

This application is a continuation-in-part of U.S. patent application Ser. No. 478,032 filed Aug. 4, 1965, now abandoned, which in turn is a continuation-in-part of U.S. patent aplication Ser. No. 85,150 filed Jan. 26, 1961, now abandoned.

BACKGROUND

The demand for organic fluids with low water contents of only a few p.p.m. has greatly increased in recent years. Dry solvents are needed for cleaning electrical and optical components. Water must be removed from jet fuel and from diluents required in many polymerization processes.

Conventional methods for drying organic liquids include the use of calcium chloride, silica gel, activated alumina and molecular sieves. However, these desiccants have a number of disadvantages. In many cases their water capacities and efficiencies are low. Regeneration often requires temperatures of 200°–350° C. or more. Selectivity is poor.

STATEMENT OF THE INVENTION

It has now been discovered that essentially anhydrous sulfonic acid cation-exchange resins in monovalent salt form are highly effective desiccants combining a rapid selective absorption of water, a high water capacity, and a convenient regeneration temperature of about 90°–200° C., preferably about 105°–170° C. More specifically, an improved process has been developed for drying fluids containing up to about 15 weight percent water by contact with a regenerable sulfonate cation-exchange resin desiccant. The improvement consists essentially in (A) contacting a fluid containing up to 15 weight percent water with an essentially anhydrous sulfonic acid cation-exchange desiccant resin in monovalent salt form, (B) separating a fluid containing a reduced water content from the desiccant resin, (C) regenerating the water-laden desiccant resin by drying at about 90°–200° C., and (D) recycling the regenerated desiccant resin.

This improved process is particularly suited for removing small amounts of water from liquid organic process streams using a column of desiccant resin which can be regenerated in situ by a stream of dry gas heated at about 105°–170° C. The water content of such liquids, as chlorinated solvents, aliphatic and aromatic hydrocarbons, phenols, alcohols and esters can be reduced to 5–10 p.p.m. (parts per million) or less by contact with the desiccant sulfonate resins at room temperature. Not only are the sulfonate desiccant resins inert to most non-acidic gases and organic fluids, but they are highly selective for water and in general will not remove inhibitors, stabilizers or other additives required by the dried gas or liquid.

DESICCANT SULFONATE RESINS

Cation-exchange resins containing sulfonic acid functional groups are widely known. They are normally prepared and used commercially in a water-wet form. Yet when carefully dried by heating at 90°–200° C., and preferably at about 105°–170° C. to an essentially anhydrous form, they have been found to be extremely efficient desiccants in either a free acid or a salt form. Further study has revealed that the moisture content and stability of these resins as desiccants depends on the ionic form and that the monovalent alkali metal and ammonium salts are unexpectedly superior to the free sulfonic acid resin particularly in terms of stability toward repeated regeneration. While the acid resins discolor and decompose when heated above about 90°–110° C., the resins in salt form are stable and can be repeatedly regenerated in situ at 90°–200° C.

In the present process, any sulfonic acid cation-exchange resin in monovalent alkali metal or ammonium salt form can be used. Quite suitable are commercial sulfonated polyvinylaromatic resins in a particulate or spherical form, preferably about 10–100 U.S. mesh. Advantageously these resins are prepared by sulfonation of a microporous or macroporous copolymer of styrene with about 0.5–30 weight percent divinylbenzene or other dialkenyl crosslinking agent.

For use in a desiccant column with repeated in situ regeneration, the sodium and potassium forms of a sulfonated polyvinylaromatic resin are preferred. To obtain a minimum effluent water content of about 1–2 p.p.m., a potassium resin is recommended because of its superior dynamic water capacity. If a higher, 2–5 p.p.m. water content is acceptable, a sodium sulfonate resin with a better equilibrium or total water capacity can be used.

PROCESS FLUIDS

Both baseous and liquid fluids which are not chemically reactive with the desiccant cation-exchange resins can be dried. However, the process is particularly suited for drying organic liquids containing less than 1.5 weight percent water using a column or bed of desiccant resin and conventional ion-exchange techniques.

Among the organic liquids which have been dried by the present process are aromatic hydrocarbons such as benzene, toluene and xylene; aliphatic hydrocarbons such as hexane and propylene, the latter under pressure; a phenolic process stream; halogenated solvents such as 1,1,1-trichloroethane, carbon tetrachloride, methylene chloride, o-dichlorobenzene and monofluortrichloromethane; alkylene oxides, etc.

PROCESS CONDITIONS

The wet process fluid can be contacted batchwise with the desiccant sulfonate resin. However, a continuous or cyclic column operation is preferred with the process fluid passing through a column of desiccant resin. Advantageously, flow rates between 0.1 and 30 gallons per minute per square foot (g.p.m./ft.$^2$) are used at a temperature of about −50° to 90° C., preferably about 0°–50° C.

In practice, a stream of the fluid to be dried is passed upflow or, preferably, downflow through a substantially anhydrous bed of the sulfonate cation-exchange resin in monovalent salt form until the effluent has a water content in excess of a desired or pre-determined value, e.g., about 1–10 p.p.m. The feed stream influent is then advantageously transferred to another substantially anhydrous resin column while the wet desiccant resin is regenerated.

REGENERATION

A major advantage of the desiccant sulfonate resins is the ease with which they can be regenerated. Advantageously regeneration is carried out by heating the resin in situ at about 90°–200° C., preferably about 105°–170° C. with an inert purge gas. When the vapors of the fluid being dried do not present a fire or explosion hazard, the purge gas is usually air. In petroleum refineries, heated natural gas or off-gas can be used. Nitrogen also is suitable.

For rapid in situ regeneration, a purge gas heated at about 105°–170° C. and passed through the resin bed at a lineal rate ($V_s$) of about 3–30 ft./min. is suitable. Nitrogen and air containing about 20–6000 p.p.m. water have been effectively used when passed upflow through a water-laden resin bed at a rate of about 3–12 ft./min. at 110°–125° C. For maximum regeneration, a small amount of essentially anhydrous purge gas is used as a finishing step.

The residual moisture content of the regenerated desiccant resin is conveniently measured by the dew point of the exit purge gas. For example, a potassium resin dried to an exit dew point of about 40° C. contains about 4 weight percent residual water, a relatively incomplete regeneration which would result in a high moisture leakage and low capacity in the next work cycle. Dried to an exit dew point of 15°–20° C., the regenerated potassium resin will have less than 1 percent residual moisture and will yield a dried fluid containing less than about 5 p.p.m. water when reused.

Normally, regeneration is carried out until the residual water content is 0.5–1.0 percent or less as determined by the dew point or other conventional method. Some applications may require less rigorous regeneration. Once the requirements for a particular application are determined, regeneration of a desiccant resin column is repeated as necessary in an alternating cycle of use and in situ regeneration.

The following examples illustrate more fully the improved process. Unless otherwise specified, all parts and percentages are by weight.

Example 1.—Na+ desiccant resin (A) A ⅜ inch by 15 inch cylindrical column of 20–50 U.S. mesh Dowex 50W–X8 resin Na+ form (a sulfonated polymeric styrene crosslinked with 8 weight percent of divinylbenzene in the sodium salt form) was air dried for 24 hours at 110° C. and then for 24 hours at 110° C. in vacuo. A hexane solution containing about 4.5% n-propanol and 0.089% water (890 p.p.m.) was passed at room temperature downflow through the dried resin bed at 3 g.p.m./ft.² and the effluent water concentration monitored. Breakthrough at about 10 p.p.m. water occurred after treating 5.6 l. of hexane feed in 10.8 hrs. operation. The resin water capacity at this point was 11 parts water sorbed per 100 parts of desiccant resin or 11%.

(B) Air containing about 5,000 p.p.m. of water was passed at a flow rate of 0.42 lineal ft./sec. at 77° C. through a 30 inch deep bed of 20–50 mesh Dowex 50W–X8 Na+ form dried as above. Concentration of water in the feed was measured with a Foxboro Dewcel, Model 2702. Concentration of water in the effluent was measured with a Beckman Electrolytic Hydrometer, Model 17901. The effluent air had an average water concentration of 10.7 p.p.m. The water capacity of the resin at breakthrough was 13.5%. Then the resin was regenerated in situ by heating at 140° C. using as a purge stream of nitrogen containing 20 p.p.m. water at a flow rate of 0.07 lineal ft./sec. When regeneration was essentially complete, the resin was cooled and returned on stream where it produced effluent air containing an average water concentration of 8.2 p.p.m.

Example 2.—K+ desiccant resin (A) A column of 20–50 mesh Dowex 50W–X8 resin, K+ form, dried in vacuo at 110–120° C. to a residual water content of less than about 0.5–1.0% was used to dehydrate a variety of organic compounds as shown in Table I. Water content of the liquids was determined by titrating electrometrically with standard aqueous methanol after adding excess Karl Fischer reagent.

TABLE I.—LIQUID DRYING WITH DOWEX 50W–X8, 20–50 MESH RESIN, K+ FORM

| Liquid | Resin bed depth, inches | Flow rate, g.m.p./ft.² | Water content, wt. percent | |
|---|---|---|---|---|
| | | | Feed | Min. effluent |
| Neutral carbonyls: | | | | |
| Diisobutylketone | 40 | 0.25 | 0.50 | 0.0155 |
| Ethyl acetate | 36 | 0.42 | 0.56 | 0.110 |
| Salicylaldehyde | 43 | 0.23 | 0.53 | 0.11 |
| Acidic materials: | | | | |
| o-Chlorophenol | 40 | 0.23 | 0.55 | 0.0052 |
| Dodecylphosphoric acid in kerosene | 36 | 0.44 | 1.50 | 0.0042 |
| Nitrogen compounds: | | | | |
| Nitromethane | 37 | 0.48 | 0.50 | Nil |
| Acrylonitrile | 34 | 0.80 | 0.56 | 0.0042 |
| Dimethylformamide | 36 | 0.50 | 0.24 | 0.0032 |
| Monoethanolamine | 64 | 0.26 | 0.42 | 0.0769 |
| Aniline | 41 | 0.49 | 0.48 | 0.0177 |

(B) An 8′ x 1.25′ OD column containing 5.5 ft.³ of dried Dowex 50W–X8 (20–50 mesh), K+ resin is used to dry a chlorophenol containing 100–500 p.p.m. water to less than 50 p.p.m. at a feed rate of 1100 lbs./hr. After treating about 33,000 lbs. of the chlorophenol, the resin column is drained and regenerated in sit with an air stream preheated to about 140° C. When the regenerant air exit temperature reaches 110° C. in about 3–4 hrs., the column is cooled and returned to the process stream. The original K+ resin has been in recycle use for more than 2 years.

(C) A porous styrene-divinylbenzene copolymer prepared by the process of Alfrey & Lloyd U.S. 3,322,695 and having a surface area of 94 m.²/g. was sulfonated with chlorosulfonic acid, converted to K+ form and dried. A column of the dried, porous K+ resin was used to dry 1,1,1-trichloroethane containing 211 p.p.m. water at a flow rate of 10 g.p.m./ft.² The effluent 1,1,1-trichloroethane contained less than 1 p.p.m. water. The resin capacity to a breakthrough of 10 p.p.m. water was 20.5 parts/100 parts dry K+ resin.

Example 3.—In situ regeneration (A) A 30″ bed (1.6″ ID) of standard Dowex 50W–X8 (20–50 mesh) Na+ form resin was used in a study of in situ regeneration with a preheated upflow of nitrogen or air at rates of from 2.0–8.5 lineal ft./min. (based on the empty column) at atmospheric pressure. In a typical regeneration with nitrogen preheated at about 125° C. and a flow rate of 2.5 ft./min., about 2 hrs. was required for the wet resin column to reach 125° C. About 40% of the total water is collected in the first hour of regeneration, and about 95% in 4–5 hrs. After about 6 hrs., the dew point of the exit gas drops sharply from about 28° C. to about 14° C. with a gradual decrease to about 7.5° C. after 9 hrs.

Regenerations at 125° C. using nitrogen containing about 20 p.p.m. water or air containing 1000 or 6000 p.p.m. water with a flow rate of about 8.5 ft./min. were nearly the same. All gave air with less than 6 p.p.m. water on the next drying cycle with a typical resin capacity of about 11.6 parts water/100 parts desiccant resin.

(B) To test the recycle stability of the sulfonate desiccant resin, a ⅜″ S.S. desiccant resin column was fitted with appropriate valves, temperature controls and timers to permit automatic operation and regeneration with a preheated nitrogen purge. A 10″ deep bed of dry Dowex 50W–X8 (20–50 mesh) Na+ resin was placed in the column and the water breakthrough curves determined with chlorobenzene containing about 200 p.p.m. water as a feed liquid at a flow rate of 13 g.p.m./ft.$^2$ cross-sectional area. An average of 14.34 lbs. of chlorobenzene was dried to a breakthrough of 10 p.p.m. water in the first 3 cycles. The average breakthrough time was 3.03 hrs.

Automatic cycling was then begun with a chlorobenzene feed time of 0.5 hr. (about 16% initial capacity). Then the column was flushed out and regeneration achieved by passing 700 ml./min. of dry nitrogen countercurrent to the loading direction while heating the column externally. A thermocouple in the resin bed near the exit reached an average temperature of 110° C. during the regeneration cycle. Then the column and regenerated desiccant resin were cooled to room temperature and the wet chlorobenzene feed resumed. A complete cycle required about 1 hour.

After a total of 97 cycles, another complete breakthrough curve was obtained. The regenerated resin now gave 11.13 lbs. of chlorobenzene with a water content under 10 p.p.m., about 77% of the initial resin capacity. No significant resin attrition or bead breakage was observed.

Example 4.—Resin stability tests

Data in Examples 1–3 demonstrate the stability of the desiccant sulfonate resins toward regeneration at temperatures of about 90–150° C. As a more stringent stability test, samples of Dowex 50W–X8 resin in both H$^+$ and K$^+$ forms were heated in air at 150° and 195° C. with periodic determination of their ion-exchange capacity and water content after reequilibration with water. As shown in Table II, the K$^+$ resin showed no significant change during these tests indicating excellent stability. However, the acid resin darkened rapidly at both 150° and 195° C. At 195° C. the decrease in capacity, equilibrium water content and sulfur content confirm extensive decomposition. Although the acid form is significantly more stable at 150° C. than at 195° C., discoloration and noticeable loss of capacity occur even on regeneration at 90°–110° C. after use in drying organic liquids. Such discoloration and decomposition has not been observed with the sodium, potassium and ammonium resins regenerated at about 105°–170° C.

Example 5.—Dynamic drying capacities

Typical results from breakthrough curves made with a number of solid desiccants using the general procedure of Example 1 are given in Table III. Such results demonstrate the dynamic efficiency and capacity of the sulfonate resins in comparison with other desiccants.

TABLE III.—DRYING ORGANIC LIQUIDS

| Liquid | H$_2$O (p.p.m.) | Resin [1] | Feed rate [2] | Min. H$_2$O in effluent (p.p.m.) | Resin capacity,[3] percent |
|---|---|---|---|---|---|
| (A) CH$_2$Cl$_2$ | 890 | K$^+$ | 10 | 1.0 | 13.7 |
|  | 890 | Na$^+$ | 10 | 2.0 | 10.6 |
|  | 890 | MS–5A | 10 | 4.0 | 7.2 |
| (B) Benzene | 665 | K$^+$ | 5 | 5.0 | 23.0 |
|  | 430 | MS–4A | 7.5 | 2.5 | 16.4 |
|  | 430 | Al$_2$O$_3$ | 7.5 | 2.5 | 5.0 |
|  | 430 | Silica gel | 7.5 | 2.5 | 10.2 |

[1] Dowex 50W–X8 in K$^+$ or Na$^+$ form; MS—molecular sieve.
[2] Gallons/min./ft.$^2$ column cross-section.
[3] Wt. percent water at 10 p.p.m. breakthrough.

Example 6.—Drying of butylene oxides

A procedure similar to that of Example 1 was repeated with a mixture of isomeric straight chain butylene oxides containing from about 0.35 water. The effluent water content was reduced to 20 p.p.m. with dry Na$^+$ and NH$_4^+$ sulfonate resins having in this system a total water capacity of about 4.3 and 5.6 wt. percent respectively.

Example 7.—Drying of ethanol

Ethanol containing ca. 2.5 weight percent water was dried to varying water contents by passage at a flow rate of 0.5 g.p.m./ft.$^2$ through 61″ by ½″ ID columns of Dowex 50W–X8 resin in Na$^+$, Cs$^+$, K$^+$ and NH$_4^+$ salt forms, predried as in Example 1. Typical operating conditions and results are shown in Table IV.

TABLE IV.—DRYING OF ETHANOL CONTAINING 2.5% H$_2$O

| H$_2$O in effluent, percent | Parts H$_2$O sorbed/100 parts dry resin ||||
|---|---|---|---|---|
|  | Na$^+$ | NH$_4^+$ | Cs$^+$ | K$^+$ |
| 0.5 | 1.5 | 2.1 | 4.5 | 6.7 |
| 1.0 | 3.5 | 4.5 | 5.3 | 8.5 |
| 1.5 | --- | 5.6 | 6.1 | 10.0 |

Example 8.—Drying of other organic liquids

A procedure similar to that of Example 1 was repeated with various organic liquids as listed below, using a 5/16 inch cylindrical column of Dowex 50W resin cross-linked with 2, 8 and 16%, divinylbenzene (DVB). Detailed conditions and results are given in following Table V. Deeper resin beds, multiple resin beds in series, and smaller particle size resins can be used when it is desired to dehydrate more completely.

TABLE V.—DRYING WITH DOWEX 50W–X8, 20–50 MESH RESIN

| Organic Liquid | Resin form | DVB, percent | Flow rate, g.p.m./ft.$^2$ | Resin bed depth, inches | Water in feed, p.p.m. | Min. H$_2$O in Effluent, p.p.m. | Breakthrough capacity [1] |
|---|---|---|---|---|---|---|---|
| Chlorinated hydrocarbons: |  |  |  |  |  |  |  |
| Methylene chloride | K$^+$ | 8 | 10 | 36 | 890 | 2.5 | 13.6 |
| Do | Na$^+$ | 8 | 10 | 36 | 890 | 2.5 | 10.6 |
| o-Dichlorobenzene | K$^+$ | 8 | 30 | 36 | 233 | 5 | 19.0 |
| Do | Na$^+$ | 8 | 30 | 36 | 274 | 5 | 24.1 |
| Carbon tetrachloride | K$^+$ | 8 | 10 | 18 | 69 | <1 | [2] 20.8 |
| Do | Na$^+$ | 8 | 10 | 18 | 60 | <1 | [2] 24.8 |
| 1,1,1-trichloroethane | K$^+$ | 8 | 10 | 30 | 248 | <1 | 23.0 |
| Do | Na$^+$ | 8 | 10 | 30 | 213 | <1 | 22.4 |
| Do | K$^+$ | 16 | 10 | 30 | 193 | <1 | 18.4 |
| Do | K$^+$ | 2 | 10 | 30 | 211 | <1 | 21.8 |
| Aromatics: |  |  |  |  |  |  |  |
| Toluene | Na$^+$ | 8 | 3 | 18 | 111 | <1 | 9.8 |
| 75% diphenyl, 25% diphenyl ether | K$^+$ | 8 | 10 | 24 | 683 | 5 | 24 |

[1] Parts H$_2$O sorbed/100 parts dry resin at 10 p.p.m. breakthrough.
[2] Parts H$_2$O sorbed/100 parts dry resin at 5 p.p.m. breakthrough.

TABLE II.—HEAT STABILITY OF DRY H$^+$ AND K$^+$ RESINS

| T.° C. | Time (days) | Capacity, meq./g. || Water content, percent [1] ||
|---|---|---|---|---|---|
|  |  | H$^+$ | K$^+$ | H$^+$ | K$^+$ |
| 150 | 0 | 4.95 | 4.16 | 49.0 | 43.7 |
|  | 2 | 4.90 | 4.17 | 46.0 | 47.4 |
|  | 8 | 4.93 | ---- | 44.6 | 49.9 |
|  | 14 | 4.72 | 4.20 | 42.4 | 48.3 |
| 195 | 0 | 4.95 | 4.16 | 49.0 | 43.7 |
|  | 2 | 3.36 | 4.20 | 33.0 | ---- |
|  | 6.2 | 2.66 | 4.28 | 30.1 | 43.1 |

[1] Determining after equilibration in Na$^+$ form.

We claim:
1. In a process for removing water from a fluid by contact with a solid desiccant, the improvement which consists essentially in:
   (A) passing a fluid containing up to 15 weight percent water through a bed consisting of an essentially anhydrous sulfonic acid cation-exchange desiccant resin in monovalent salt form, the fluid being chemically non-reactive with the resin, the rate of passing of the fluid and the depth of the bed being selected such as to substantially completely dry the fluid;
   (B) separating the dried fluid from the desiccant resin;
   (C) regenerating the water-laden desiccant resin by drying at about 105° C. to 175° C. for a period of time sufficient to remove the sorbed water, and (D) recycling the regenerated desiccant resin.

2. The process of claim 1 where the desiccant resin is in sodium form.

3. The process of claim 1 where the desiccant resin is in potassium form.

4. The process of claim 1 where the desiccant resin is a sulfonated polyvinylaromatic resin.

5. The process of claim 1 where the desiccant resin is regenerated by drying at about 105°–170° C. in contact with a non-reactive purge gas.

6. The process of claim 5 where the purge gas is air.

7. The process of claim 5 where the purge gas is nitrogen.

8. The process of claim 1 where an organic liquid containing less than 1.5 weight percent water is passed through a bed of the desiccant resin at about −50° to 90° C.

9. The process of claim 8 where the organic liquid is an aliphatic hydrocarbon.

10. The process of claim 8 where the organic liquid is an aromatic hydrocarbon.

11. The process of claim 8 where the organic liquid is a halogenated hydrocarbon.

12. The process of claim 8 where the organic liquid is a phenol.

13. The process of claim 8 where the recovered organic liquid contains less than about 50 p.p.m. water.

14. The process of claim 8 where a chlorophenol containing about 100–500 p.p.m. water is passed through a bed of desiccant resin in $K^+$ form and dried to a residual water content less than about 50 p.p.m.

References Cited

UNITED STATES PATENTS

| 2,909,572 | 10/1959 | Solomon | 208—188 |
| 2,976,265 | 3/1961 | Pearce | 260—2.2 |
| 3,082,166 | 3/1963 | Skarstrom. | |

OTHER REFERENCES

Rohm and Haas Company; "Amberlite IR–120 Technical Notes" (April 1955), pp. 1–3.

Dow Chemical Company: "Dowex: Ion Exchange," 1958, p. 69.

SAMIAH N. ZAHARNA, *Primary Examiner.*

U.S. Cl. X.R.

208—188; 210—41; 260—2.2